(12) United States Patent
Dai et al.

(10) Patent No.: US 11,708,056 B2
(45) Date of Patent: Jul. 25, 2023

(54) EMERGENCY BRAKING CONTROL CIRCUIT BASED ON COUPLER COUPLING DETECTION

(71) Applicant: CRRC Nanjing Puzhen Co., Ltd., Nanjing (CN)

(72) Inventors: Pengcheng Dai, Nanjing (CN); Xun Mao, Nanjing (CN); Juan Xue, Nanjing (CN); Haixia Huang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 448 days.

(21) Appl. No.: 17/047,398

(22) PCT Filed: Dec. 5, 2019

(86) PCT No.: PCT/CN2019/123206
§ 371 (c)(1),
(2) Date: Oct. 14, 2020

(87) PCT Pub. No.: WO2021/109056
PCT Pub. Date: Jun. 10, 2021

(65) Prior Publication Data
US 2023/0126718 A1    Apr. 27, 2023

(30) Foreign Application Priority Data

Dec. 3, 2019  (CN) .......................... 201911219020.7

(51) Int. Cl.
*B61H 13/20*  (2006.01)
*B60T 7/12*   (2006.01)
(Continued)

(52) U.S. Cl.
CPC ............ *B60T 7/128* (2013.01); *B60T 13/665* (2013.01); *B60T 17/228* (2013.01); *B61C 17/12* (2013.01); *B61H 13/20* (2013.01)

(58) Field of Classification Search
CPC ........ B61H 11/02; B61H 13/00; B61H 13/20; B61C 17/00; B61C 17/12; B60T 13/665; B60T 17/228
See application file for complete search history.

(56) References Cited

U.S. PATENT DOCUMENTS

| 2015/0083529 A1 | 3/2015 | Tione |
| 2017/0247024 A1 | 8/2017 | Anstey |

FOREIGN PATENT DOCUMENTS

| CN | 103318193 A | 9/2013 |
| CN | 105620516 A | 6/2016 |

(Continued)

*Primary Examiner* — Vishal R Sahni
(74) *Attorney, Agent, or Firm* — Bayramoglu Law Offices LLC

(57) ABSTRACT

An emergency braking control circuit based on coupler coupling detection includes a coupler status detection circuit and a coupler status relay that are connected in series with a train power loop. A normally open contact of the coupler status relay is connected to an emergency braking train line in a cross-parallel manner. When a coupler is coupled normally, inductive proximity sensors located at a knuckle and a central pivot are closed to drive the coupler status relay, and the normally open contact of the coupler status relay is connected in a cross-parallel manner to ensure that a corresponding node of the emergency braking loop is closed. In case of abnormal coupling or accidental uncoupling of couplers, the inductive proximity sensors of the couplers of two adjacent cars are disconnected simultaneously, the coupler status relays of the two cars are powered off, and emergency braking is applied.

12 Claims, 2 Drawing Sheets

(51) Int. Cl.
*B60T 17/22* (2006.01)
*B61C 17/12* (2006.01)
*B60T 13/66* (2006.01)

(56) References Cited

FOREIGN PATENT DOCUMENTS

| | | | |
|---|---|---|---|
| CN | 106184181 A | | 12/2016 |
| CN | 106394596 A | | 2/2017 |
| CN | 107867280 A | | 4/2018 |
| CN | 108674440 A | | 10/2018 |
| CN | 109109851 A | | 1/2019 |
| CN | 110164230 A | * | 8/2019 |

* cited by examiner

US 11,708,056 B2

EMERGENCY BRAKING CONTROL CIRCUIT BASED ON COUPLER COUPLING DETECTION

CROSS REFERENCE TO THE RELATED APPLICATIONS

This application is the national phase entry of International Application No. PCT/CN2019/123206, filed on Dec. 5, 2019, which is based upon and claims priority to Chinese Patent Application No. 201911219020.7, filed on Dec. 3, 2019, the entire contents of which are incorporated herein by reference.

TECHNICAL FIELD

The present invention relates to the technical field of rail vehicle emergency braking control circuits, in particular to a semi-automatic or fully automatic coupler status control and emergency circuit for a rail vehicle.

BACKGROUND

As one of the most basic and important parts of a rail vehicle, a coupler is used to couple two cars, so that the machinery, air circuit, and electric circuit are connected, and the cars form a unity. As the society pays more attention to the safety performance of public transportation, a reasonable and stable semi-automatic coupler monitoring circuit and an emergency loop linkage circuit of the coupler become extremely important for the stable operation of the vehicle.

The successful coupling of the coupler is a prerequisite for the safe and normal operation of the train. The coupler status monitoring circuit is used to ensure that in case the coupler is accidentally uncoupled, the vehicle takes a timely emergency measure, namely emergency braking, as soon as possible. In addition, even when the coupler status monitoring device fails, the vehicle circuit must ensure that the emergency braking of the train can still be applied and relieved normally.

At present, the application circuit of rail vehicle coupler status monitoring in the emergency braking loop adopts a contact connector. In the contact connector solution, the coupler status is connected in series with the emergency braking loop by means of connector contacts. However, the frequent relative movement of the coupler causes severe wear of the contact of the connector, which affects the conduction performance of the loop. As a result, the train accidentally applies emergency braking, affecting the usability of the emergency braking loop.

Therefore, it is highly desirable to provide a suitable and usable application circuit that not only can normally feed back the coupling status of the coupler but also can ensure the usability of the emergency circuit in the event of a fault. This is an urgent problem to be solved by those skilled in the art.

SUMMARY

In order to solve the above-mentioned problems existing in the prior art, an objective of the present invention is to provide an emergency braking control circuit based on coupler coupling detection. The present invention uses a coupling signal output to drive a coupler status relay and finally controls an emergency braking loop through a contact of the relay.

In order to solve the above-mentioned technical problems, the present invention provides an emergency braking control circuit based on coupler coupling detection, which is applicable to a vehicle with two emergency braking train lines, wherein the first emergency braking train line is controlled by a remote train operation, and the second emergency braking train line is controlled by a local train operation. A local vehicle M1 and an opposite vehicle M2 are each provided with an independent emergency braking control circuit. The emergency braking control circuit includes a coupler status detection circuit SCUP and a coupler status relay SCR that are connected in series with a train power loop. When the coupler status detection circuit SCUP detects that a coupler is coupled, the coupler status relay SCR is driven to be powered on. The coupler status relay SCR has two normally open contacts. A first emergency braking train line L1 of the local vehicle M1 and a second emergency braking train line L4 of the opposite vehicle M2 are connected by a coupler or a jumper. A second emergency braking train line L2 of the local vehicle M1 and a first emergency braking train line L3 of the opposite vehicle M2 are connected by a coupler or a jumper.

A first normally open contact SCR1-1 of a coupler status relay of the local vehicle M1 is connected in series with the second emergency braking train line L2 of the local vehicle M1. A first normally open contact SCR2-1 of a coupler status relay of the opposite vehicle M2 is connected in series with the second emergency braking train line L4 of the opposite vehicle M2. A second normally open contact SCR1-2 of the coupler status relay of the local vehicle M1 is connected in parallel with the first normally open contact SCR2-1 of the coupler status relay of the opposite vehicle M2, and both ends thereof are respectively connected to the first emergency braking train line L1 of the local vehicle M1 and the second emergency braking train line L4 of the opposite vehicle M2. A second normally open contact SCR2-2 of the coupler status relay of the opposite vehicle M2 is connected in parallel with the first normally open contact SCR1-1 of the coupler status relay of the local vehicle M1, and both ends thereof are respectively connected to the second emergency braking train line L2 of the local vehicle M1 and the first emergency braking train line L3 of the opposite vehicle M2.

Alternatively, the first normally open contact SCR1-1 of the coupler status relay of the local vehicle M1 is connected in series with the first emergency braking train line L1 of the local vehicle M1. The first normally open contact SCR2-1 of the coupler status relay of the opposite vehicle M2 is connected in series with the first emergency braking train line L of the opposite vehicle M2. The second normally open contact SCR1-2 of the coupler status relay of the local vehicle M1 is connected in parallel with the first normally open contact SCR2-1 of the coupler status relay of the opposite vehicle M2, and both ends thereof are respectively connected to the second emergency braking train line L2 of the local vehicle M1 and the first emergency braking train line L3 of the opposite vehicle M2. The second normally open contact SCR2-2 of the coupler status relay of the opposite vehicle M2 is connected in parallel with the first normally open contact SCR1-1 of the coupler status relay of the local vehicle M1, and both ends thereof are respectively connected to the first emergency braking train line L1 of the local vehicle M1 and the second emergency braking train line L4 of the opposite vehicle M2.

Further, the emergency braking control circuit further includes a coupler status monitoring bypass switch SCRBS that is connected in parallel across the coupler status detection circuit SCUP and configured to bypass the coupler status detection circuit when the coupler status detection circuit fails, so as to directly drive the coupler status relay SCR to be powered on.

When the coupler is coupled normally, the inductive proximity sensors that are located at a knuckle and a central pivot are closed to drive the coupler status relay, and the normally open contacts of the coupler status relay are connected in a cross-parallel manner to ensure that a corresponding node of the emergency braking loop is closed. In case of abnormal coupling or accidental uncoupling of couplers, the inductive proximity sensors of the couplers of two adjacent cars are disconnected simultaneously, the coupler status relays of the two cars are powered off, and emergency braking is applied. In this way, the emergency braking circuit of the present invention will not be disabled due to sensor failure or single relay failure, which increases the reliability of the circuit. Moreover, this solution reduces unnecessary jumpers and components, and accurately reflects the coupling status of the coupler.

Compared with the prior art, the present invention provides the linkage between accidental uncoupling of the coupler and emergency braking.

DETAILED DESCRIPTION OF THE EMBODIMENTS

The implementations of the present invention are explained below by taking motor vehicles M1 and M2 coupled by semi-automatic couplers as an example with reference to the drawings. In the present embodiment, the local vehicle M1 and the opposite vehicle M2 are coupled by Voith semi-automatic couplers, and the model thereof is 330.539. Optionally, the present invention is also applicable to fully automatic couplers.

Figure 1:
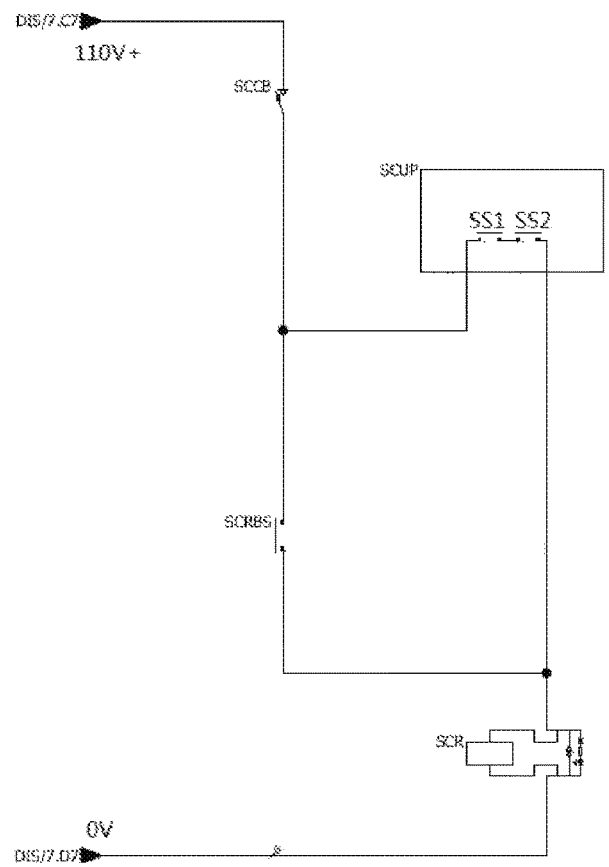
FIG. 1 is a schematic diagram of an emergency braking control circuit according to the present invention.

The present embodiment provides an emergency braking control circuit based on coupler coupling detection, which is applicable to a vehicle with two emergency braking train lines, wherein the first emergency braking train line is controlled by a remote train operation, and the second emergency braking train line is controlled by a local train operation. The local vehicle M1 and the opposite vehicle M2 are each provided with an independent emergency braking control circuit. As shown in FIG. 1, the emergency braking control circuit includes the coupler status monitoring circuit breaker SCCB, the coupler status detection circuit SCUP and the coupler status relay SCR that are connected in series with a train power loop. A train control and management system (TCMS) monitors the status of the coupler status relay SCR.

When the coupler status detection circuit SCUP detects that a coupler is coupled, the coupler status relay SCR is driven to be powered on. The emergency braking control circuit further includes a coupler status monitoring bypass switch SCRBS connected in parallel across the coupler status detection circuit SCUP. When the coupler status detection circuit SCUP fails and outputs 0, the coupler status monitoring bypass switch SCRBS may be operated to bypass a fault signal.

Figure 2:
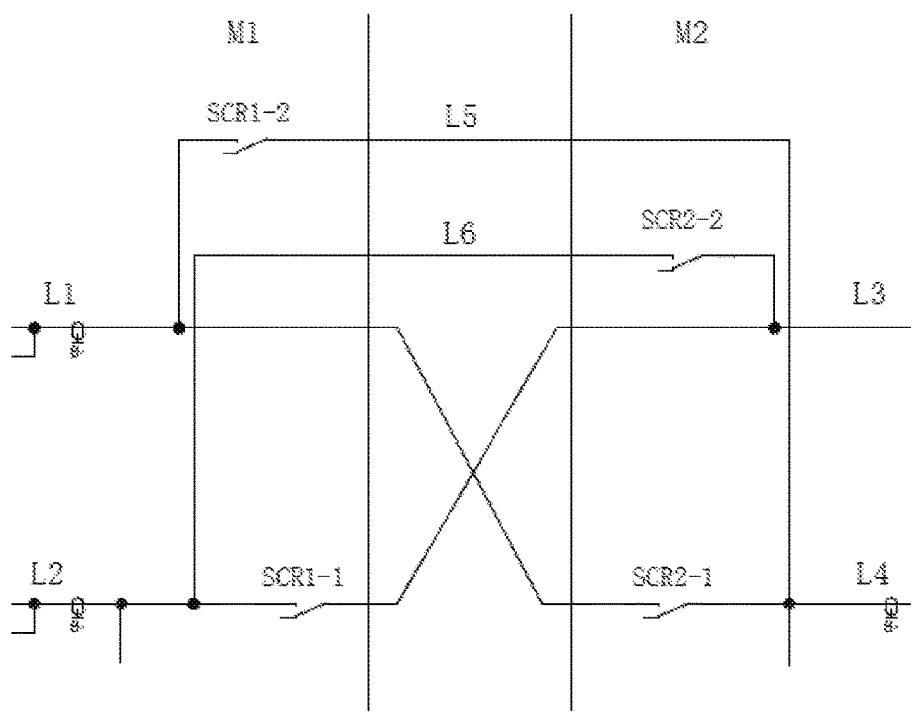
FIG. 2 is a circuit diagram of emergency braking train lines of coupled vehicles according to the present invention.

The local vehicle M1 and the opposite vehicle M2 are each provided with the coupler status relay SCR, and the coupler status relay SCR has two normally open contacts. As shown in FIG. 2, the first emergency braking train line L1 of the local vehicle M1 and the second emergency braking train line L4 of the opposite vehicle M2 are connected by a jumper, e.g., a semi-automatic coupler connects an electric line through a jumper, and a fully automatic coupler connects an electric line through an electric coupler. The second emergency braking train line L2 of the local vehicle M1 and the first emergency braking train line L3 of the opposite vehicle M2 are connected by a jumper.

In the present embodiment, the first normally open contact SCR1-1 of the coupler status relay of the local vehicle M1 is connected in series with the second emergency braking train line L2 of the local vehicle M1. The first normally open contact SCR2-4 of the coupler status relay of the opposite vehicle M2 is connected in series with the second emergency braking train line L4 of the opposite vehicle M2.

The second normally open contact SCR1-2 of the coupler status relay of the local vehicle M1 is connected in parallel with the first normally open contact SCR2-1 of the coupler status relay of the opposite vehicle M2, and both ends thereof are respectively connected to the first emergency braking train line L1 of the local vehicle M1 and the second emergency braking train line L4 of the opposite vehicle M2. The second normally open contact SCR2-2 of the coupler status relay of the opposite vehicle M2 is connected in parallel with the first normally open contact SCR1-1 of the coupler status relay of the local vehicle M1, and both ends thereof are respectively connected to the second emergency braking train line L2 of the local vehicle M1 and the first emergency braking train line L3 of the opposite vehicle M2.

As shown in FIG. 2, the second normally open contact SCR1-2 of the coupler status relay of the local vehicle M1 is connected to the first parallel circuit L5, and the second normally open contact SCR2-2 of the coupler status relay of the opposite vehicle M2 is connected to the second parallel circuit L6. The first parallel circuit L5 and the second parallel circuit L6 are connected through a jumper.

A train power supply supplies power to the coupler status detection circuit SCUP. The coupler status detection circuit SCUP has two inductive proximity sensors SS1 and SS2 separately provided on a knuckle and a central pivot of the coupler. When the coupler is connected, the two inductive proximity sensors SS1 and SS2 are closed, and the coupler status detection circuit SCUP drives the coupler status relay SCR to be powered on. When the coupler is uncoupled, the two proximity sensors are separated, the coupler status detection circuit SCUP outputs 0, and the coupler status relay SCR is powered off.

As an alternative solution, the first normally open contact of the coupler status relay may be provided in the first emergency braking train line of the corresponding vehicle, and then the second normally open contact of the coupler status relay is connected in parallel with the first normally open contact of the coupler status relay of the opposite vehicle. Specifically, the first normally open contact SCR1-1 of the coupler status relay of the local vehicle M1 is connected in series with the first emergency braking train line L1 of the local vehicle M1. The first normally open contact SCR2-1 of the coupler status relay of the opposite vehicle M2 is connected in series with the first emergency braking train line L4 of the opposite vehicle M2. The second normally open contact SCR1-2 of the coupler status relay of the local vehicle M1 is connected in parallel with the first normally open contact SCR2-1 of the coupler status relay of the opposite vehicle M2, and both ends thereof are respectively connected to the second emergency braking train line L2 of the local vehicle M1 and the first emergency braking train line L3 of the opposite vehicle M2. The second normally open contact SCR2-2 of the coupler status relay of the opposite vehicle M2 is connected in parallel with the first normally open contact SCR1-1 of the coupler status relay of the local vehicle M1, and both ends thereof are respectively connected to the first emergency braking train line L1 of the local vehicle M1 and the second emergency braking train line L4 of the opposite vehicle M2.

Figure 3:
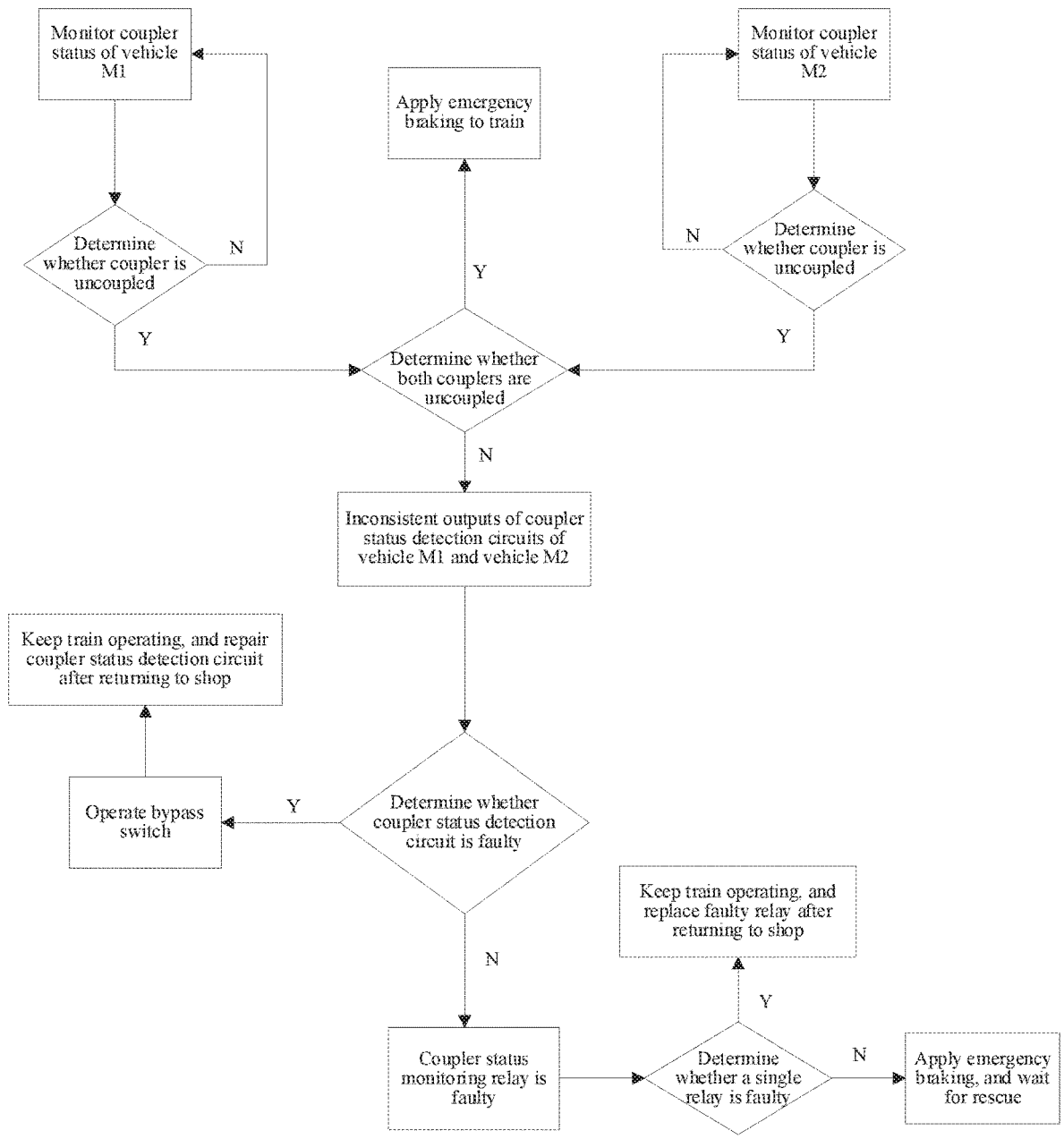
FIG. 3 is a flow chart of an emergency braking method according to the present invention.

As shown in FIG. 3, an emergency braking control method based on the circuit of the present invention includes:

It is determined that whether the coupler is uncoupled based on the coupler status relay SCR. For example, it is determined that the coupler is uncoupled if the coupler status relay SCR is powered off. Emergency braking is applied to the train if it is determined that the couplers of the local vehicle M1 and the opposite vehicle M2 are both uncoupled. It is determined that the outputs of the coupler status detection circuits SCUP of the two vehicles are not consistent if it is determined that only the coupler of the local vehicle M1 or the coupler of the opposite vehicle M2 is uncoupled. Then, it is determined that whether the coupler status detection circuit SCUP is faulty. If the coupler status detection circuit SCUP is faulty, the bypass switch SCRBS of the vehicle that is determined to be decoupled is operated to keep the emergency braking train line powered on, the train continues to operate, and the coupler status detection circuit SCUP is checked and repaired after returning to a shop. If the coupler status detection circuit SCUP is not faulty, it is determined that whether the coupler status relay SCR of the vehicle at a single side is faulty. If only one coupler status relay SCR fails, the train continues to operate, and the coupler status relay SCR is replaced after returning to a shop. If both coupler status relays SCR fail, a braking system is activated to apply emergency braking, and the vehicles wait for rescue.

The present invention may have other implementations in addition to those embodiments described above. All technical solutions obtained by equivalent replacements or equivalent transformations shall fall within the scope of protection of the present invention.

What is claimed is:

1. An emergency braking control circuit based on coupler coupling detection, wherein
    the emergency braking control circuit is applied to a vehicle with two emergency braking train lines;
    a first emergency braking train line of the two emergency braking train lines is controlled by a remote train operation, and a second emergency braking train line of the two emergency braking train lines is controlled by a local train operation;
    a local vehicle and an opposite vehicle are each provided with the emergency braking control circuit, wherein the emergency braking control circuit of the local vehicle and the emergency braking control circuit of the opposite vehicle are independent of each other;
    the emergency braking control circuit comprises a coupler status detection circuit and a coupler status relay, wherein the coupler status detection circuit and the coupler status relay are connected in series with a train power loop;
    when the coupler status detection circuit detects that a coupler is coupled, the coupler status relay is driven to be powered on;
    the coupler status relay has two normally open contacts;
    a first emergency braking train line of the local vehicle and a second emergency braking train line of the opposite vehicle are connected by a first coupler or a first jumper;
    a second emergency braking train line of the local vehicle and a first emergency braking train line of the opposite vehicle are connected by a second coupler or a second jumper;
    a first normally open contact of the coupler status relay of the local vehicle is connected in series with the second emergency braking train line of the local vehicle;
    a first normally open contact of the coupler status relay of the opposite vehicle is connected in series with the second emergency braking train line of the opposite vehicle;
    a second normally open contact of the coupler status relay of the local vehicle is connected in parallel with the first normally open contact of the coupler status relay of the opposite vehicle, and both ends of the second normally oven contact of the coupler status relay of the local vehicle are respectively connected to the first emergency braking train line of the local vehicle and the second emergency braking train line of the opposite vehicle;
    a second normally open contact of the coupler status relay of the opposite vehicle is connected in parallel with the first normally open contact of the coupler status relay of the local vehicle, and both ends of the second normally open contact of the coupler status relay of the opposite vehicle are respectively connected to the second emergency braking train line of the local vehicle and the first emergency braking train line of the opposite vehicle; or
    the first normally open contact of the coupler status relay of the local vehicle is connected in series with the first emergency braking train line of the local vehicle; the first normally open contact of the coupler status relay of the opposite vehicle is connected in series with the first emergency braking train line of the opposite vehicle; the second normally open contact of the coupler status relay of the local vehicle is connected in parallel with the first normally open contact of the coupler status relay of the opposite vehicle, and the both ends of the second normally open contact of the coupler status relay of the local vehicle are respectively connected to the second emergency braking train line of the local vehicle and the first emergency braking train line of the opposite vehicle; the second normally open contact of the coupler status relay of the opposite vehicle is connected in parallel with the first normally open contact of the coupler status relay of the local vehicle, and the both ends of the second normally open contact of the coupler status relay of the opposite vehicle are respectively connected to the first emergency braking train line of the local vehicle and the second emergency braking train line of the opposite vehicle.

2. The emergency braking control circuit according to claim 1,
    further comprising a coupler status monitoring circuit breaker, wherein the coupler status monitoring circuit breaker is connected in series between a train power supply and the coupler status detection circuit.

3. The emergency braking control circuit according to claim 1,
further comprising a coupler status monitoring bypass switch, wherein the coupler status monitoring bypass switch is connected in parallel across the coupler status detection circuit.

4. The emergency braking control circuit according to claim 1, wherein
a train power supply supplies power to the coupler status detection circuit;
the coupler status detection circuit has two inductive proximity sensors;
when the coupler is coupled, the two inductive proximity sensors are closed, and the coupler status detection circuit drives the coupler status relay to be powered on;
when the coupler is uncoupled, the two proximity sensors are separated, the coupler status detection circuit outputs 0, and the coupler status relay is powered off.

5. The emergency braking control circuit according to claim 1, wherein
a train control and management system (TCMS) monitors a status of the coupler status relay.

6. The emergency braking control circuit according to claim 1, wherein
the second normally open contact of the coupler status relay of the local vehicle is connected to a first parallel circuit, and the second normally open contact of the coupler status relay of the opposite vehicle is connected to a second parallel circuit; and
the first parallel circuit and the second parallel circuit are connected by a third coupler or a third jumper.

7. A rail vehicle, comprising the emergency braking control circuit according to claim 1.

8. The rail vehicle according to claim 7, wherein
the emergency braking control circuit further comprises a coupler status monitoring circuit breaker, wherein the coupler status monitoring circuit breaker is connected in series between a train power supply and the coupler status detection circuit.

9. The rail vehicle according to claim 7, wherein
the emergency braking control circuit further comprises a coupler status monitoring bypass switch, wherein the coupler status monitoring bypass switch is connected in parallel across the coupler status detection circuit.

10. The rail vehicle according to claim 7, wherein
a train power supply supplies power to the coupler status detection circuit;
the coupler status detection circuit has two inductive proximity sensors;
when the coupler is coupled, the two inductive proximity sensors are closed, and the coupler status detection circuit drives the coupler status relay to be powered on;
when the coupler is uncoupled, the two proximity sensors are separated, the coupler status detection circuit outputs 0, and the coupler status relay is powered off.

11. The rail vehicle according to claim 7, wherein
a train control and management system (TCMS) monitors a status of the coupler status relay.

12. The rail vehicle according to claim 7, wherein
the second normally open contact of the coupler status relay of the local vehicle is connected to a first parallel circuit, and the second normally open contact of the coupler status relay of the opposite vehicle is connected to a second parallel circuit; and
the first parallel circuit and the second parallel circuit are connected by a third coupler or a third jumper.

* * * * *